Figure 1:
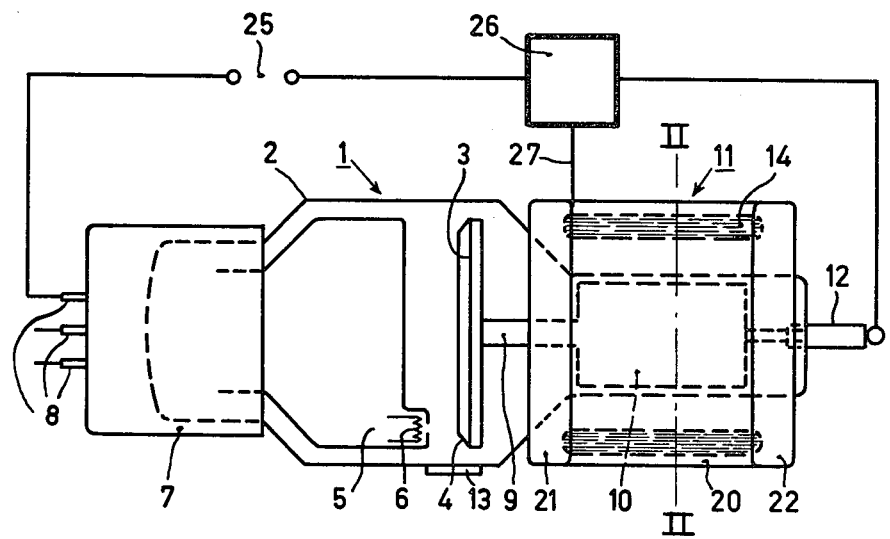
Figure 2:
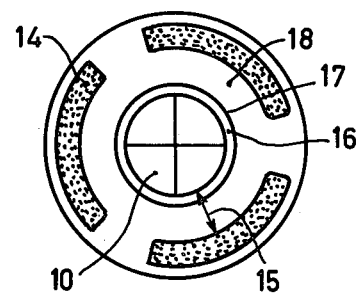

United States Patent [19]

Lakerveld et al.

[11] 4,065,674

[45] Dec. 27, 1977

[54] ROTARY-ANODE X-RAY TUBE

[75] Inventors: Herman Gerard Lakerveld; Johan Adriaan Rietdijk, both of Eindhoven, Netherlands

[73] Assignee: U.S. Philips Corporation, New York, N.Y.

[21] Appl. No.: 730,675

[22] Filed: Oct. 7, 1976

[30] Foreign Application Priority Data

Oct. 13, 1975 Netherlands ............................ 7511984

[51] Int. Cl.² .............................................. H05G 1/70
[52] U.S. Cl. .......................................... 250/406; 313/60
[58] Field of Search ....................... 250/401, 402, 406; 313/60

[56] References Cited

U.S. PATENT DOCUMENTS 3,963,930  6/1976  Fiocca .................................... 250/406

*Primary Examiner*—Craig E. Church
*Attorney, Agent, or Firm*—Frank R. Trifari

[57] ABSTRACT

The stator of the drive motor of a rotary anode X-ray tube is composed of a plurality of radially displaceable sector elements. As a result, the anode can be accelerated and decelerated while using a narrow airgap, and the airgap can be widened for bridging the high voltage to be applied at a later stage. The invention can be realized in automated form by using a blocking device for the high voltage and a tachometer.

4 Claims, 2 Drawing Figures

ROTARY-ANODE X-RAY TUBE

The invention relates to an X-ray tube comprising a rotary anode and a drive motor which comprises a rotor which is rigidly connected to the anode and a stator which is arranged about the rotor.

The anode of rotary anode X-ray tubes is commonly connected to high voltage, whilst the cathode, and hence the filament power supply, has at least approximately earth potential. The stator of the drive motor is also kept at earth potential, mainly for reasons of safety. Consequently, the high voltage applied during operation will be present across the airgap between the stator and the rotor. Optimum transfer of energy from the stator to the rotor requires an airgap which is as narrow as possible, but this is substantially restricted by the neccessity of the bridging of the high voltage. In tubes which are used in practice a compromise has been reached, where notably flash-over is avoided, so that a comparatively poor transfer of energy is accepted. As a result, either the drive motor requires a high power, notably during the acceleration of the rotation of the anode until the desired speed is reached, or the starting time is necessarily comparatively long. In modern X-ray diagnostic apparatus, short starting times are increasingly demanded, for example, at the change-over from fluoroscopy to image recording. Attempts to eliminate the presence of the required high voltage across the airgap in the drive motor by using a different potential distribution in the X-ray tube, have been rather unsuccessful thus far.

The invention has for its object to provide an X-ray tube in which both requirements as regards the airgap are satisfied. To this end, an X-ray tube of the kind set forth in accordance with the invention is characterized in that the stator is composed of a plurality of radially movable sector elements.

For starting the anode, for which the largest amount of energy is required by far, the airgap can be minimized in an X-ray tube in accordance with the invention. The high voltage is not yet applied. When the anode has reached the desired speed, the stator can be widened by the sliding out of the sector elements and the high voltage can be applied. During the deceleration of the anode, a similar procedure can be followed in the reverse direction.

In a preferred embodiment of the X-ray tube in accordance with the invention, the stator consists of three sector elements which are arranged about a portion of the tube envelope in which the rotor is accommodated and which bear against the envelope in the closed condition. In a further preferred embodiment, the X-ray tube comprises a high voltage generator which includes a blocking member so that the high voltage can be applied only in the slide-out position of the stator.

Some preferred embodiments of the X-ray tube in accordance with the invention will be described in detail hereinafter with reference to the drawing which diagrammatically shows a side elevation and a sectional view of an X-ray tube in accordance with the invention which comprises three sector elements.

An X-ray tube 1 accommodates, within an envelope 2 which is preferably made of glass, an anode disc 3 having a target 4 and a cathode 5 with a filament 6. A base 7 with input pins 8 is arranged around the envelope on the cathode side. The anode disc 4 is connected, by way of a stem 9, to a rotor 10 of a drive motor 11 and can be connected to a potential of, for example, up to 100 kV by way of a passage pin 12. Electrons released from the filament 6 or from an emitter heated thereby are accelerated by this high voltage towards the target 4 where they generate X-rays which can depart from the tube via a window 13. The rotor 10 also assumes this high voltage in practical embodiments of X-ray tubes. A stator 14 of the drive motor is arranged about the envelope. Thus, the stator is situated on the outside of the X-ray tube in this case, so that for safety reasons it is already undesirably for this stator to assume this high potential. Thus, the applied high voltage will be present between the stator 14 and the rotor 10. A space 15 therebetween, normally and also hereinafter referred to as the airgap of the motor, in this case comprises a vacuum portion 16, a glass portion 17 and an air portion 18.

The width of the airgap can be varied across the portion 18 by composing the stator in accordance with the invention of a plurality of sector elements, in this case three but two or more than three are also feasible, and by disposing the windings thereon so that these elements can be radially slid out. Induction motors having an adjustable airgap are known per se, for example, from U.S. Pat. No. 3,265,949. Therein, the airgap variation is used to control the speed of the motor. In order to ensure easy sliding in and out of the stator elements, they are accommodated in a holder 20 which is connected to the tube envelope 2. In this holder guides are provided, preferably on the ends 21 and 22, for displacing the stator elements with at least one radial component. On one or both sides drive means are provided for performing this movement. These means may comprise, for example, a manually operable ring, but preferably consist of electrical drive elements. Because no accurately defined intermediate positions need be adjusted, the construction of the drive means may be comparatively simple.

Preferably, the high voltage can be applied to the tube only after the stator elements have reached the slid-out position. To this end, in a preferred embodiment a high voltage network comprising a high voltage generator 25 includes a switching element 26 which is controlled, via a lead 27, by the adjusting mechanism of the stator elements. In a preferred embodiment of the stator, the sector elements consist of toroidally wound coils, so that the length of the stator is substantially reduced for a given power. The number of elements can again be chosen at random. An example of a stator of this kind is described in Philips Technical Review 34, No. 7, page 173.

What is claimed is:

1. An X-ray tube comprising a rotary anode and a drive motor which comprises a rotor which is rigidly connected to the anode and a stator which is arranged about the rotor, characterized in that the stator is composed of a plurality of radially movable sector elements.

2. An X-ray tube as claimed in claim 1, characterized in that the stator comprises three sector elements which, in the closed condition, bear against a housing accommodating the rotor.

3. An X-ray tube as claimed in claim 1, characterized in that it comprises a high voltage blocking circuit which is controlled by the position of the sector elements of the stator.

4. An X-ray tube as claimed in claim 1, characterized in that it comprises a tachometer and a switching circuit for automatically sliding the sector elements of the stator when a preset speed of the rotor is approached.

* * * * *